(12) United States Patent
De Koning

(10) Patent No.: US 6,360,937 B1
(45) Date of Patent: Mar. 26, 2002

(54) FRICTION STIR WELDING

(75) Inventor: Arij Uden De Koning, Zwolle (NL)

(73) Assignee: Fokker Aerostructures B.V., Papendrecht (NL)

( * ) Notice: Subject to any disclaimer, the term of this patent is extended or adjusted under 35 U.S.C. 154(b) by 0 days.

(21) Appl. No.: 09/559,487

(22) Filed: Apr. 27, 2000

(30) Foreign Application Priority Data

Apr. 27, 1999 (NL) .............................................. 1011908

(51) Int. Cl.[7] ........................ B23K 20/12; B23K 31/02; B23K 37/00

(52) U.S. Cl. ....................... 228/112.1; 228/2.1

(58) Field of Search ............... 228/112.1, 2.1, 228/114.5

(56) References Cited

U.S. PATENT DOCUMENTS

| 4,144,110 | A |   | 3/1979  | Luc |              |
|-----------|---|---|---------|-----|--------------|
| 5,460,317 | A | * | 10/1995 | Thomas et al. | 228/112.1 |
| 5,794,835 | A | * | 8/1998  | Colligan et al. | 228/2.1 |
| 5,829,664 | A | * | 11/1998 | Spinella et al. | 228/112.1 |
| 5,975,406 | A | * | 11/1999 | Mahoney et al. | 228/112.1 |
| 6,045,028 | A | * | 4/2000  | Martin et al. | 228/112.1 |
| 6,068,178 | A | * | 5/2000  | Michisaka | 228/112.1 |
| 6,070,784 | A | * | 6/2000  | Holt et al. | 228/112.1 |
| 6,102,636 | A | * | 8/2000  | Geise | 409/231 |
| 6,168,066 | B1| * | 1/2001  | Arbegast | 228/102 |

FOREIGN PATENT DOCUMENTS

| EP | 0615480 B1 |   | 11/1995 |            |
|----|------------|---|---------|------------|
| EP | 0810056 A  | * | 12/1997 | 228/112.1  |
| EP | 0810056 A2 | * | 12/1997 | 228/112.1  |
| GB | 572789     |   | 10/1945 |            |
| JP | 57149082   |   | 9/1982  |            |
| JP | 61176484   |   | 8/1986  |            |
| SU | 1362593 A2 |   | 12/1987 |            |
| SU | 1433522 A1 |   | 10/1988 |            |
| WO | WO 9310935 |   | 6/1993  |            |
| WO | WO 9526254 |   | 10/1995 |            |

* cited by examiner

*Primary Examiner*—Tom Dunn
*Assistant Examiner*—L. Edmondson
(74) *Attorney, Agent, or Firm*—Young & Thompson

(57) ABSTRACT

Elements to be joined to one another are clamped such that parts thereof which face one another and are to be joined are immovable with respect to one another. A mandrel is brought into contact with the parts in the region of a joint to be produced. The mandrel is cyclically moved with respect to the elements such that frictional heat is generated and the parts are brought into a plastic state. The distribution of frictional heat is influenced in at least one of the elements such that the frictional heat is essentially concentrated in the parts of the at least one element which have been brought into the plastic state. The parts brought into the plastic stat are allowed to cool in order to form the joint.

12 Claims, 4 Drawing Sheets

FRICTION STIR WELDING

BACKGROUND OF THE INVENTION

The invention relates to the field of friction stir welding (FSW). With this technique elements are joined to one another by means of a mandrel which is rotating or is movable back and forth and which is moved over the boundary surface of the elements. Frictional heat is generated as a result of the interaction between the cyclically moving mandrel and said elements. This frictional heat is dependent on, inter alia, the contact force and the tracking speed of the mandrel.

BACKGROUND OF THE INVENTION

The characteristic feature of friction stir welding is that no melting of the elements to be joined takes place. A soft, plastic welding zone is formed which is forged under the influence of the cyclic movements of the mandrel.

This joining technique has the advantage that the joint has a high strength which is appreciably higher than the strength obtained with fusion welding such as TIG (tungsten inert gas) and MIG (metal inert gas) welding.

A further advantage is that it is possible to join together alloys and combinations of materials for which the conventional welding techniques are unsuitable. The alloys of the 2000 series (AlCuMg), 6000 series (AlMgSi), and 7000 series (AlZnMgCu) used in the air freight and aerospace industries may be mentioned as an example.

For such materials use must be made of other joining techniques, such as riveting or gluing. However, each of these techniques has drawbacks, such as fatigue problems and relatively high production costs.

EP-B 0 615 480 discloses a method for joining elements by means of friction stir welding. The elements are brought into the plastic state by the moving mandrel, after which hardening commences and the joint is produced.

SUMMARY OF THE INVENTION

With friction stir welding, it must be possible to control the heat balance in a desired manner for the purpose of obtaining the plastic state of the elements and maintaining this state for a specific period, which period is needed in order to obtain mixing of the plastic components.

In this respect the invention provides an improved method for joining elements to one another by means of friction stir welding, comprising the following steps:
  clamping the elements such that the parts thereof which face one another and are to be joined are immovable with respect to one another,
  bringing a mandrel into contact with said parts in the region of the joint to be produced,
  cyclic movement of the mandrel with respect to the elements such that frictional heat is generated and the parts are brought into the plastic state,
  influencing the distribution of frictional heat in at least one of said elements such that the frictional heat is essentially concentrated in the parts of said at least one element which have been brought into the plastic state, and
  allowing the parts brought into the plastic state to cool in order to form the joint.

Especially in the case of metal elements, which have good conductivity in respect of heat and consequently rapidly lose heat, it is important to concentrate the heat as far as possible at the location of the joint. By this means the plastic state can be achieved more rapidly. Moreover, the cyclic movement of the mandrel can be less intensive, whilst nevertheless an appreciable tracking speed remains possible.

As a result the production speed can be higher without an excessively large amount of energy having to be supplied.

The method according to the invention can comprise the step for bringing at least one element into contact with an insulator which has a lower coefficient of thermal conductivity than the elements. Preferably, the major proportion of the surface of the element is brought into contact with the insulator.

In combination with restricting the dissipation of heat in certain regions of the elements, accelerated dissipation of heat in other regions can be desirable. To this end the method according to the invention can comprise the step for bringing at least one element into contact with a heat conductor which has at least the same coefficient of thermal conductivity as said element.

As a consequence of these measures a good resultant joint can be obtained if a rotary mandrel which has a circumferential speed of at most 37 m/min and preferably in the region of 20–31 m/min is used.

The mandrel can be moved relative to the parts with a tracking speed of at least 400 mm/min.

A mandrel which has an external surface made of ceramic material can also be used. The ceramic material can influence the thermal insulation and the generation of frictional heat in a desirable manner.

Such a mandrel can have been coated with a zirconium oxide or with an aluminium oxide.

BRIEF DESCRIPTION OF THE DRAWINGS

The invention will be explained in more detail below with reference to set-ups shown in the figures for carrying out the method according to the invention.

DETAILED DESCRIPTION OF THE PREFERRED EMBODIMENTS

Figure 1:
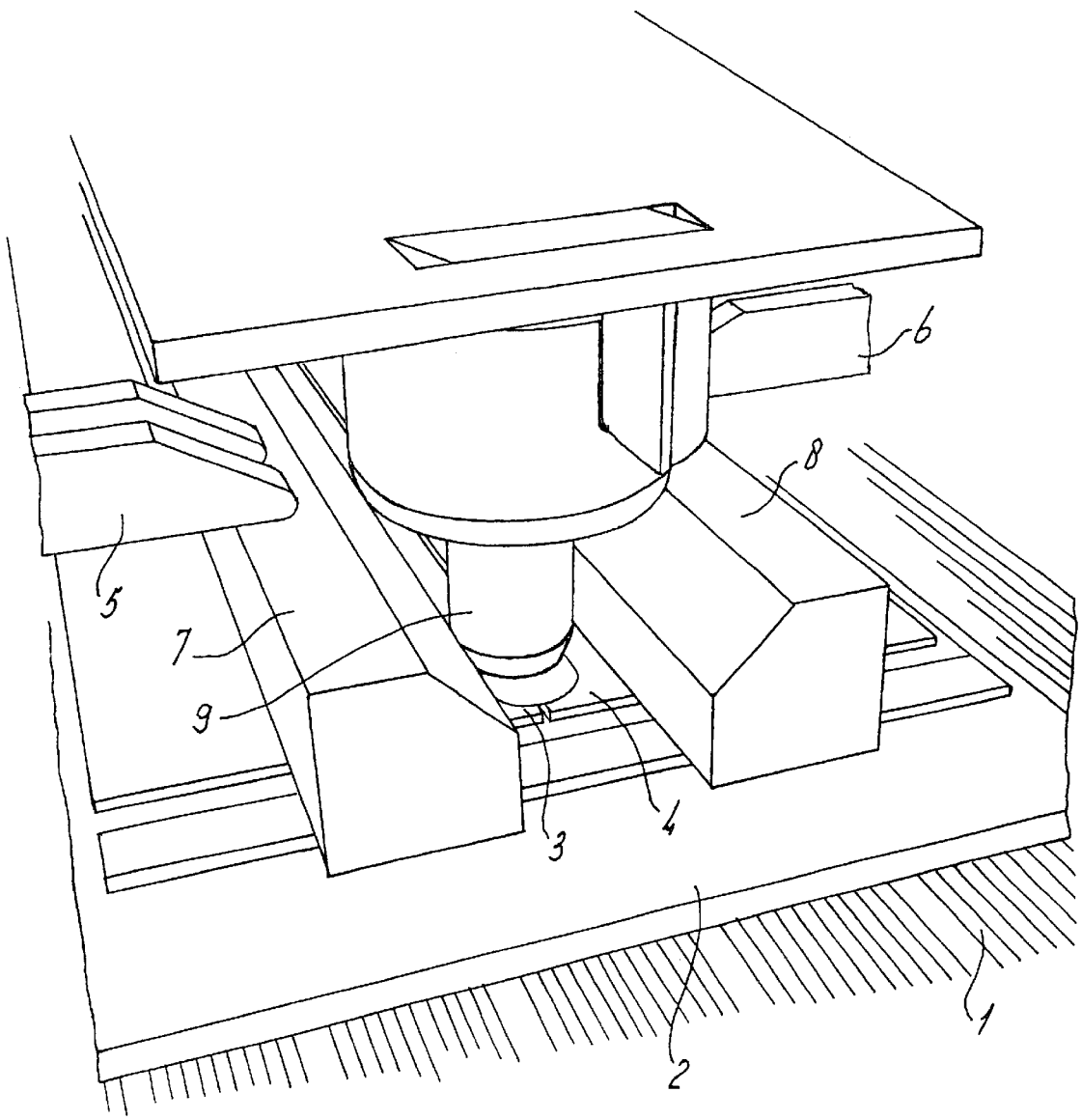
FIG. 1 shows a perspective view of one set-up.

The set-up shown in FIG. 1 for butt welding of elements to one another has a bed 1 of a machine tool. Said bed 1 has a sole plate 2 made of a relatively thermally insulating material. Said sole plate 2 can, for example, be made of stainless steel or of titanium.

The strips 3, 4 of an aluminium alloy to be joined to one another are clamped on said sole plate 2 by means of the clamping jaws 5, 6 mounted on the bed 1 and clamping bars 7, 8. Said clamping bars 7, 8 press the strips 3, 4 firmly in contact with the sole plate 2 and also play a role in the heat balance during friction stir welding. They can, for example, be made of a material which is a relatively good thermal conductor, such that the strips 3, 4, and in particular those parts located some distance away from the weld, do not become too hot.

Those edges of the strips 3, 4 which face one another are brought into the plastic state by means of the rotary tool 9 with the mandrel 10 (see also FIG. 2) and the material of the strips is mixed by the rotary movement of the mandrel 10. After the material of the strips 3, 4 which has been mixed in this way has cooled the joint is complete.

Figure 2:
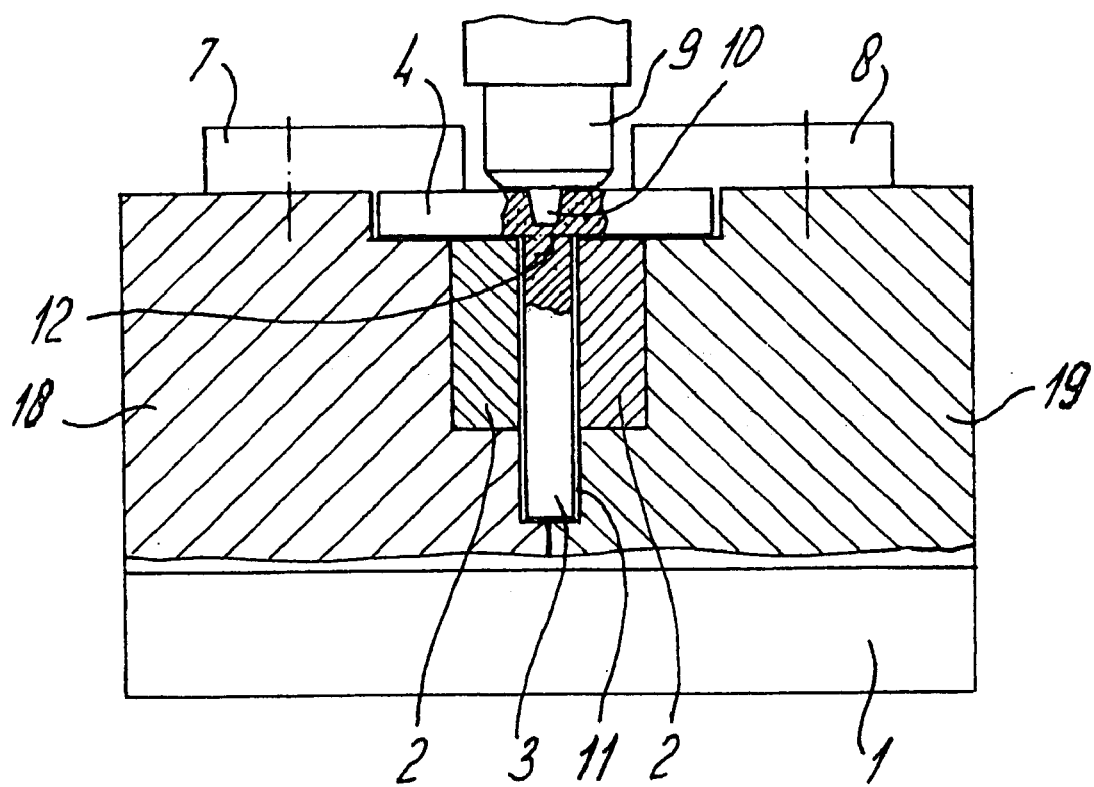
FIG. 2 shows a cross-section of another set-up.

The set-up shown in FIG. 2 is suitable for the production of a T construction by friction stir welding. For this purpose the vertical leg 3 of the T is accommodated in a recess 11 between two aluminium support blocks 18, 19, each of which is fixed to the bed 1.

The recess 11 in the aluminium blocks 18, 19 is lined with stainless steel strips 2, which have an insulating effect. As a result the heat produced during friction stir welding can remain concentrated in the region of the weld 12.

The horizontal arm 4 of the T is pressed firmly onto the vertical leg 3 by means of clamping bars 7, 8, so that by use of the mandrel good mixing of the material which has been rendered plastic can be obtained.

The clamping bars 7, 8 are preferably made of copper and provide for removal of heat. The combined effect of the stainless steel insulators 2 and of the copper conductors 7, 8 provides the desired heat balance in the region of the weld 12.

Figure 3:
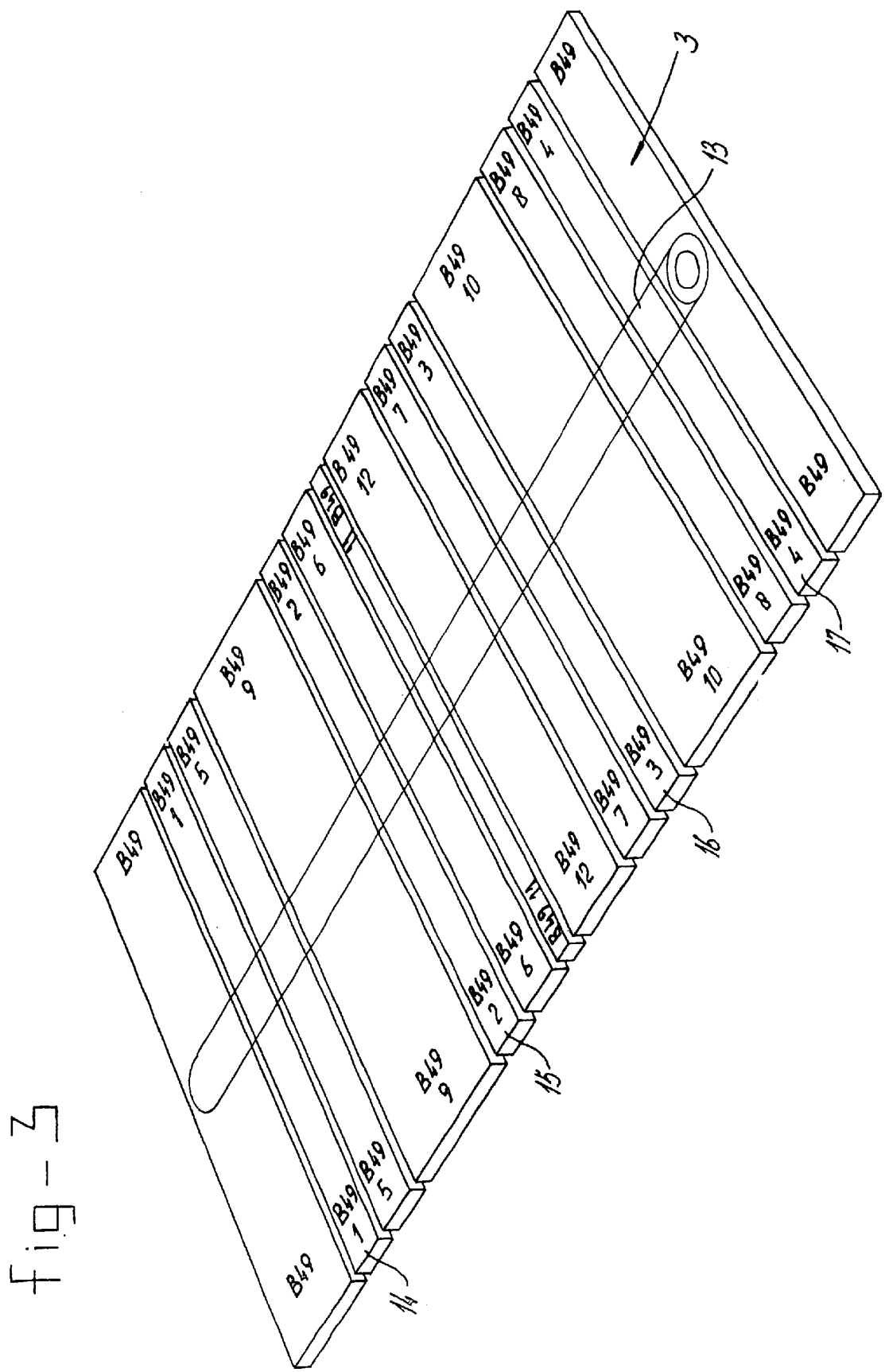
FIG. 3 shows a product with test strips.

The results for a number of test pieces which have been joined to one another by means of the friction stir welding method described above are shown in the chart in FIG. 4. In total four test strips 14–17 were taken from a sample as shown in FIG. 3. Said sample comprises two plates 3, 4 attached to one another by means of the friction stir weld 13, which were then sawn into test pieces.

Figure 4:
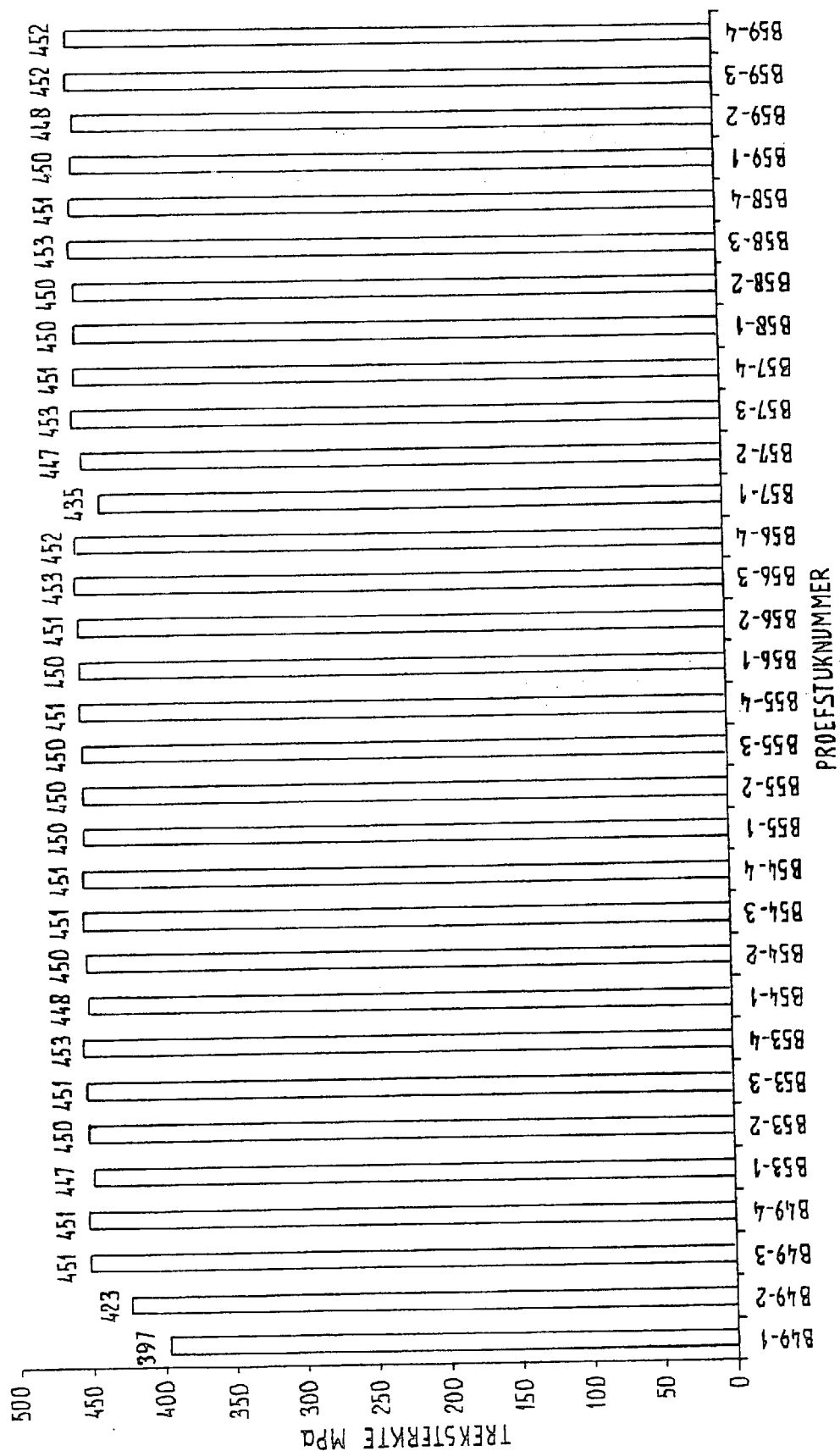
FIG. 4 is a bar chart of the ultimate tensile stresses in respect of the test strips in FIG. 3.

FIG. 4 shows the results for a total of 32 test pieces, that is to say four test strips with eight samples from each. An ultimate tensile stress of approximately 450 MPa was determined for virtually all test pieces.

What is claimed is:

1. Method for joining elements to one another by means of friction stir welding, comprising the following steps:

clamping the elements such that parts thereof which face one another and are to be joined are immovable with respect to one another, bringing a mandrel into contact with the parts in the region of a joint to be produced, cyclically moving the mandrel with respect to the elements such that frictional heat is generated and the parts are brought into a plastic state, limiting the distribution of frictional heat in at least one of the elements such that the frictional heat is concentrated in and localized to the parts of the at least one element which have been brought into the plastic state, wherein the step of limiting the distribution of frictional heat comprises bringing at least one element into contact with a static insulator which has a lower coefficient of thermal conductivity than the element, and allowing the parts brought into the plastic state to cool in order to form the joint.

2. Method according to claim 1, wherein the major proportion of the surface of at least one element is brought into contact with the insulator.

3. Method according to claim 1, wherein the step of limiting the distribution of frictional heat further comprises bringing at least one element into contact with a heat conductor which has at least the same coefficient of thermal conductivity as the element, the heat conductor acting as a heat sink to reduce the heat distributed away from a localized area.

4. Method according to claim 1, wherein the mandrel comprises a rotary mandrel having a speed of revolution of at most 600 revolutions per minute.

5. Method according to claim 4, wherein the speed of rotation is in the range of 400–500 revolutions per minute.

6. Method according to claim 1, wherein the mandrel comprises a rotary mandrel having a circumferential speed of at most 37 m/min.

7. Method according to claim 6, wherein the circumferential speed is in the range of 20–31 m/min.

8. Method according to claim 1, wherein the mandrel moves relative to the parts at a tracking speed of at least 400 mm/min.

9. Method according to claim 1, wherein the step of limiting the distribution of frictional heat further comprises providing the mandrel with an external surface made of ceramic material.

10. Method according to claim 9, wherein the ceramic material comprises zirconium oxide.

11. Method according to claim 9, wherein the ceramic material comprises aluminium oxide.

12. A method of friction stir welding two elements together, comprising the steps of:

clamping the two elements in a fixed relation to one another on top of a stationary lower heat conduction means;

heating a joint region with a mandrel to bring the joint region into a plastic state; and a step for providing on an upper surface of each of the two elements a heat conduction means so as to provide two facing static heat conduction means for limiting the distribution of the frictional heat to be localized at the joint region restricted in areas apart from the joint region.

* * * * *